United States Patent
Yamazaki

(10) Patent No.: US 9,560,603 B2
(45) Date of Patent: Jan. 31, 2017

(54) MOBILE COMMUNICATION SYSTEM, MOBILE COMMUNICATION METHOD, RADIO BASE STATION, AND RADIO TERMINAL

(71) Applicant: KYOCERA CORPORATION, Kyoto (JP)

(72) Inventor: Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/380,984

(22) PCT Filed: Feb. 26, 2013

(86) PCT No.: PCT/JP2013/055007
§ 371 (c)(1),
(2) Date: Aug. 26, 2014

(87) PCT Pub. No.: WO2013/129419
PCT Pub. Date: Sep. 6, 2013

(65) Prior Publication Data
US 2015/0304961 A1    Oct. 22, 2015

Related U.S. Application Data

(60) Provisional application No. 61/604,697, filed on Feb. 29, 2012.

(51) Int. Cl.
*H04W 52/24* (2009.01)
*H04W 72/04* (2009.01)
*H04W 72/12* (2009.01)

(52) U.S. Cl.
CPC ....... *H04W 52/242* (2013.01); *H04W 72/0413* (2013.01); *H04W 72/0473* (2013.01); *H04W 72/1289* (2013.01)

(58) Field of Classification Search
CPC .................................................. H04W 52/242
(Continued)

(56) References Cited

U.S. PATENT DOCUMENTS 5,241,685 A * 8/1993 Bodin ................... H04W 48/20
455/436
6,064,885 A * 5/2000 Rouhollahzadeh ... H04W 64/00
342/450
(Continued)

FOREIGN PATENT DOCUMENTS

WO     2010/150807 A1    12/2010

OTHER PUBLICATIONS

International Search Report; PCT/JP2013/055007; May 7, 2013.
(Continued)

*Primary Examiner* — Andrew Lai
*Assistant Examiner* — Andrew C Lee
(74) *Attorney, Agent, or Firm* — Studebaker & Brackett PC

(57) ABSTRACT

A mobile communication system is a system in which a plurality of radio base stations receive an uplink signal transmitted from a radio terminal coordinated with one another. At least one radio base station of the plurality of radio base stations comprises: a notification unit that notifies the radio terminal of information for specifying the plurality of radio base stations. The radio terminal comprises a control unit that specifies the plurality of radio base stations on the basis of the information notified from the notification unit, and that performs transmission power control of the uplink signal in accordance with the path losses between each of the plurality of radio base stations and the radio terminal.

7 Claims, 6 Drawing Sheets

(58) Field of Classification Search
USPC .................................. 370/329, 336, 338
See application file for complete search history.

(56) References Cited

U.S. PATENT DOCUMENTS

| | | | | | |
|---|---|---|---|---|---|
| 6,069,883 | A * | 5/2000 | Ejzak | ............... | H04W 28/22 370/335 |
| 6,351,651 | B1 * | 2/2002 | Hamabe | ............... | H04W 52/343 455/522 |
| 7,991,365 | B2 * | 8/2011 | Karmi | ............... | H04B 7/0615 375/267 |
| 8,233,844 | B2 * | 7/2012 | Shan | ............... | H04W 16/14 370/232 |
| 8,331,975 | B2 * | 12/2012 | Lin | ............... | H04W 52/08 455/127.1 |
| 8,452,316 | B2 * | 5/2013 | Sutivong | ............... | 370/334 |
| 8,706,154 | B2 * | 4/2014 | Lee | ............... | H04B 7/0615 455/522 |
| 2002/0111184 | A1 * | 8/2002 | Takano | ............... | H04W 52/40 455/522 |
| 2002/0115459 | A1 * | 8/2002 | Chuang | ............... | H04W 52/08 455/522 |
| 2002/0193115 | A1 * | 12/2002 | Furukawa | ............... | H04W 52/245 455/442 |
| 2004/0005906 | A1 * | 1/2004 | Okumura | ............... | H04W 52/50 455/522 |
| 2004/0057507 | A1 * | 3/2004 | Rotstein | ............... | H04L 1/0001 375/219 |
| 2005/0113129 | A1 * | 5/2005 | Robinson | ............... | H04W 36/18 455/524 |
| 2005/0265236 | A1 * | 12/2005 | Kwon | ............... | H04L 1/0002 370/235 |
| 2005/0277419 | A1 * | 12/2005 | Takano | ............... | H04W 52/40 455/442 |
| 2006/0030350 | A1 * | 2/2006 | Mitchell | ............... | H04W 52/146 455/522 |
| 2006/0270408 | A1 * | 11/2006 | Kobayashi | ............... | H04W 36/0094 455/440 |
| 2006/0270434 | A1 * | 11/2006 | Iacono | ............... | H04B 7/0604 455/522 |
| 2007/0037584 | A1 * | 2/2007 | Um | ............... | H04W 36/18 455/456.1 |
| 2007/0082620 | A1 * | 4/2007 | Zhang | ............... | H04W 52/24 455/69 |
| 2007/0201405 | A1 * | 8/2007 | Santhanam | ............... | H04W 52/10 370/335 |
| 2008/0084848 | A1 * | 4/2008 | Jard | ............... | H04W 52/143 370/332 |
| 2008/0175185 | A1 * | 7/2008 | Ji | ............... | H04W 52/243 370/318 |
| 2008/0207249 | A1 * | 8/2008 | Choi | ............... | H04W 52/12 455/522 |
| 2008/0247365 | A1 * | 10/2008 | Carlsson | ............... | H04W 72/082 370/337 |
| 2009/0129322 | A1 * | 5/2009 | Suwa | ............... | H04W 28/24 370/329 |
| 2010/0023830 | A1 * | 1/2010 | Wengerter | ............... | H04L 1/0025 714/748 |
| 2010/0034173 | A1 * | 2/2010 | Luo | ............... | H04W 36/30 370/332 |
| 2010/0091726 | A1 * | 4/2010 | Ishii | ............... | H04L 1/18 370/329 |
| 2010/0296467 | A1 * | 11/2010 | Pelletier | ............... | H04W 74/0833 370/329 |
| 2011/0034173 | A1 * | 2/2011 | Tenorio Sanz | ............... | H04N 1/00307 455/445 |
| 2011/0105121 | A1 * | 5/2011 | Kazmi | ............... | H04W 36/30 455/436 |
| 2011/0111766 | A1 * | 5/2011 | Yang | ............... | H04W 52/241 455/452.2 |
| 2011/0170496 | A1 * | 7/2011 | Fong | ............... | H04L 5/0053 370/329 |
| 2011/0171992 | A1 * | 7/2011 | Seo | ............... | H04W 52/10 455/522 |
| 2011/0281525 | A1 * | 11/2011 | Furuskar | ............... | H04B 17/0042 455/67.11 |
| 2011/0300895 | A1 * | 12/2011 | Tsuruoka | ............... | H04W 52/146 455/522 |
| 2012/0009969 | A1 * | 1/2012 | Park | ............... | H04W 52/10 455/522 |
| 2012/0028630 | A1 * | 2/2012 | Yamamoto | ............... | H04W 52/242 455/422.1 |
| 2012/0087332 | A1 * | 4/2012 | Kim | ............... | H04B 7/063 370/329 |
| 2012/0113818 | A1 * | 5/2012 | Kim | ............... | H04W 52/365 370/248 |
| 2012/0115531 | A1 * | 5/2012 | Gaal | ............... | H04B 7/04 455/522 |
| 2012/0127911 | A1 | 5/2012 | Nishikawa et al. | | |
| 2012/0307745 | A1 * | 12/2012 | Panchal | ............... | H04W 52/242 370/329 |
| 2013/0003663 | A1 * | 1/2013 | Blankenship | ............... | H04L 5/0053 370/329 |
| 2013/0089034 | A1 * | 4/2013 | Acharya | ............... | H04W 48/20 370/329 |

OTHER PUBLICATIONS

CATT; "Uplink power control discussions for CoMP"; 3GPP TSG RAN WG1 Meeting #67 R1-113736; San Francisco, USA Nov. 14, 2011; pp. 1-5.

Zte; "Considerations for uplink power control in UL CoMP"; 3GPP TSG RAN WG1 Meeting #68 R1-120827; Dresden, Germany Feb. 6, 2012; pp. 1-5.

3GPP TS 36.300 V9.4.0 (Jun. 2010); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

* cited by examiner

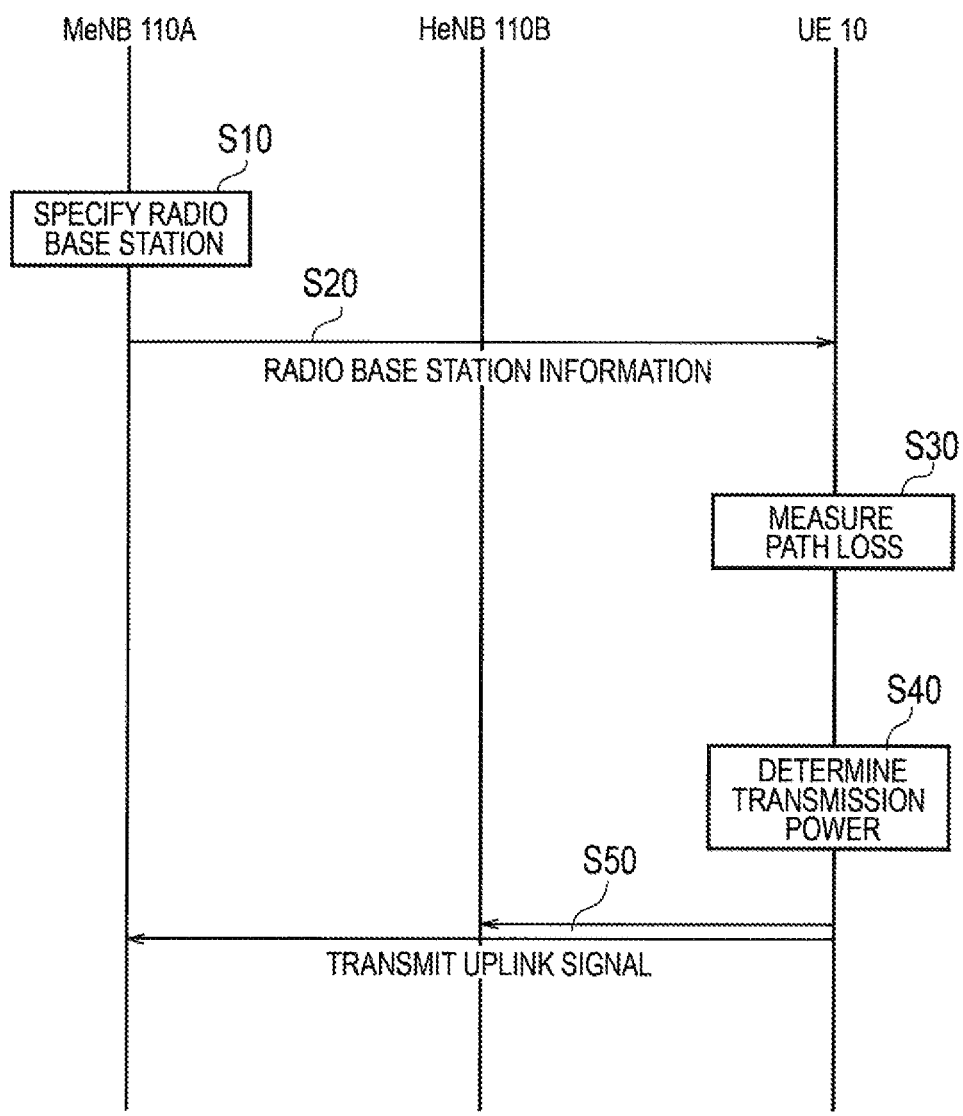

MOBILE COMMUNICATION SYSTEM, MOBILE COMMUNICATION METHOD, RADIO BASE STATION, AND RADIO TERMINAL

TECHNICAL FIELD

The present invention relates to a mobile communication system in which a plurality of radio base stations receive an uplink signal transmitted from a radio terminal coordinated with one another, a mobile communication method used in the mobile communication system, a radio base station and a radio terminal.

BACKGROUND ART

Conventionally, there has been known a mobile communication system in which a plurality of radio base stations receive an uplink signal transmitted from a radio terminal coordinated with one another. In such a mobile communication system, selection combining of the uplink signals received in the plurality of radio base stations is performed.

For example, in LTE (Long Term Evolution), the uplink signal is transmitted through PUSCH (Physical Uplink Shared Channel). The transmission power control of the uplink signal is performed on the basis of the path loss between the radio terminal and the radio base station.

However, a case is assumed wherein in a mobile communication system in which a plurality of radio base stations receive an uplink signal transmitted from a radio terminal coordinated with one another, when the transmission power control of the uplink signal is performed on the basis of the path loss between any one radio base station of the plurality of radio base stations and the radio terminal, the transmission power of the uplink signal becomes excessive.

For example, a case is assumed in which a radio base station that manages a pico cell (hereinafter, called a pico base station), and a radio base station that manages a macro cell (hereinafter, called a macro base station) coexist as the radio base station, and the transmission power control of the uplink signal is performed on the basis of the path loss between the macro base station and the radio terminal. In such a case, when the radio terminal is far from the macro base station and is positioned near the pico base station, the transmission power of the uplink signal becomes excessive for the pico base station.

PRIOR ART DOCUMENT

Patent Document

Patent Document 1: 3GPP TS 36.300 V9.4.0

SUMMARY OF THE INVENTION

A mobile communication system of a first feature is a system in which a plurality of radio base stations receive an uplink signal transmitted from a radio terminal coordinated with one another. At least one radio base station of the plurality of radio base stations comprises: a notification unit that notifies the radio terminal of information for specifying the plurality of radio base stations. The radio terminal comprises a control unit that specifies the plurality of radio base stations on the basis of the information notified from the notification unit, and that performs transmission power control of the uplink signal in accordance with the path losses between each of the plurality of radio base stations and the radio terminal.

In the first feature, the radio base station comprising the notification unit is a radio base station that assigns an uplink resource to the radio terminal.

In the first feature, the path loss used in the transmission power control of the uplink signal is a smallest path loss among path losses between each of the plurality of the radio base stations and the radio terminal.

In the first feature, the path loss used in the transmission power control of the uplink signal is a reciprocal of a sum of reciprocals of a predetermined number of path losses among path losses between each of the plurality of the radio base stations and the radio terminal.

In the first feature, the predetermined number of path losses is selected in an order starting from a smallest path loss among path losses between each of the plurality of the radio base stations and the radio terminal.

A mobile communication method of a second feature is a method for receiving an uplink signal transmitted from a radio terminal at a plurality of radio base stations coordinated with one another. The mobile communication method comprising: a step A of notifying, by at least one radio base station of the plurality of radio base stations, to the radio terminal, information for specifying the plurality of radio base stations; and a step B of specifying, by the radio terminal, the plurality of radio base stations on the basis of the information notified in step A, and performing, by the radio terminal, the transmission power control of the uplink signal in accordance with the path losses between each of the plurality of radio base stations and the radio terminal.

A radio base station of a third feature is used in a mobile communication system in which a plurality of radio base stations receive an uplink signal transmitted from a radio terminal coordinated with one another. The radio base station comprising: a notification unit that notifies the radio terminal of information for specifying the plurality of radio base stations.

A radio terminal of a fourth feature is used in a mobile communication system in which a plurality of radio base stations receive an uplink signal transmitted from a radio terminal coordinated with one another. The radio terminal comprising: a reception unit that receives information for specifying the plurality of radio base stations from at least one radio base station of the plurality of radio base stations; and a control unit that specifies the plurality of radio base stations on the basis of the information received in the reception unit, and that performs transmission power control of the uplink signal in accordance with the path losses between each of the plurality of radio base stations and the radio terminal.

BRIEF DESCRIPTION OF THE DRAWINGS

FIG. 7 is a sequence diagram illustrating an operation of the mobile communication system 100 according to the first embodiment.

DESCRIPTION OF THE EMBODIMENT

Figure 1:
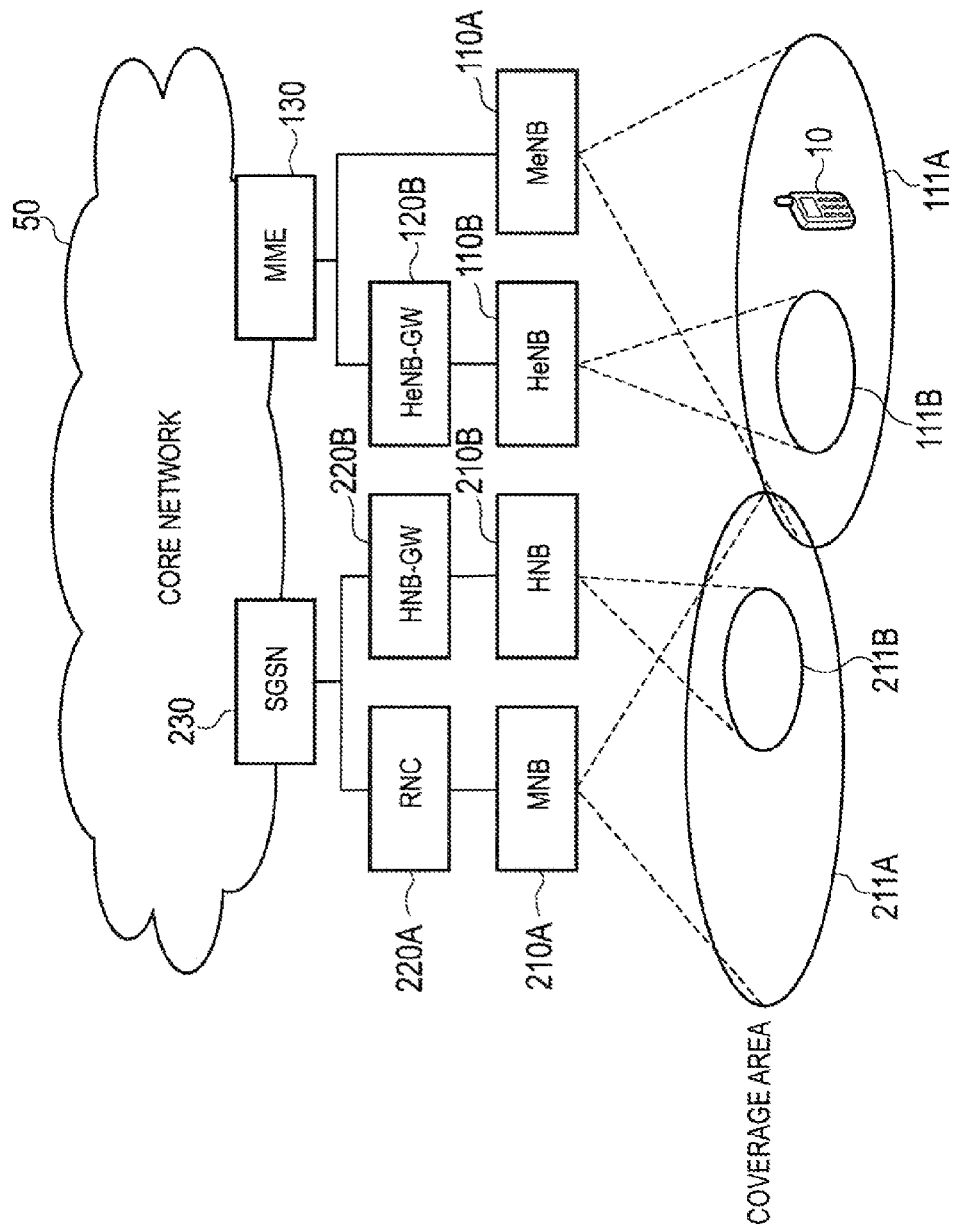
FIG. 1 is a diagram illustrating a mobile communication system 100 according to a first embodiment.

Hereinafter, a mobile communication system according to an embodiment of the present invention will be described with reference to the accompanying drawings. Note that in the descriptions of the drawing below, identical or similar symbols are assigned to identical or similar portions.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

[Overview of Embodiment]

A mobile communication system of an embodiment is a system in which a plurality of radio base stations receive an uplink signal transmitted from a radio terminal coordinated with one another. At least one radio base station of the plurality of radio base stations comprises: a notification unit that notifies the radio terminal of the information for specifying the plurality of radio base stations. The radio terminal includes a control unit that specifies the plurality of radio base stations on the basis of the information notified from the notification unit, and performs transmission power control of the uplink signal in accordance with the path losses between each of the plurality of radio base stations and the radio terminal.

According to the embodiment, the radio terminal specifies the plurality of radio base stations that receive the uplink signal coordinated with one another on the basis of the information notified from the radio base station, and performs transmission power control of the uplink signal in accordance with path losses between each of the plurality of radio base stations and the radio terminal. As a result, the state in which the transmission power of the uplink signal is excessive is avoided, and the transmission power of the uplink signal can be controlled appropriately.

[First Embodiment]

(Mobile Communication System)

Hereinafter, a mobile communication system according to a first embodiment will be described. FIG. 1 is a diagram illustrating a mobile communication system 100 according to the first embodiment.

As illustrated in FIG. 1, the mobile communication system 100 includes a radio terminal 10 (hereinafter, referred to as UE 10) and a core network 50. Furthermore, the mobile communication system 100 includes a first communication system and a second communication system.

The first communication system, for example, is a communication system corresponding to LTE (Long Term Evolution). The first communication system, for example, has a base station 110A (hereinafter, referred to as MeNB 110A), a home base station 110B (hereinafter, referred to as HeNB 110B), a home base station gateway 120B (hereinafter, referred to as HeNB-GW 120B), and MME 130.

In addition, a radio access network (E-UTRAN; Evolved Universal Terrestrial Radio Access Network) corresponding to the first communication system is configured by the MeNB 110A, the HeNB 110B, and the HeNB-GW 120B.

The second communication system, for example, is a communication system corresponding to UMTS (Universal Mobile Telecommunication System). The second communication system includes a base station 210A (hereinafter, referred to as MNB 210A), a home base station 210B (hereinafter, referred to as HNB 210B), RNC 220A, a home base station gateway 220B (hereinafter, referred to as HNB-GW 220B), and SGSN 230.

In addition, a radio access network (UTRAN; Universal Terrestrial Radio Access Network) corresponding to the second communication system is configured by the MNB 210A, the HNB 210B, the RNC 220A, and the HNB-GW 220B.

The UE 10 is a device (User Equipment) configured to communicate with the second communication system or the first communication system. For example, the UE 10 has a function of performing radio communication with the MeNB 110A and the HeNB 110B. Alternatively, the UE 10 has a function of performing radio communication with the MNB 210A and the HNB 210B.

The MeNB 110A, which manages a general cell 111A, is a device (evolved NodeB) that performs radio communication with the UE 10 being present in the general cell 111A.

The HeNB 110B, which manages a specific cell 111B, is a device (Home evolved NodeB) that performs radio communication with the UE 10 being present in the specific cell 111B.

The HeNB-GW 120B, which is connected to the HeNB 110B, is a device (Home evolved NodeB Gateway) that manages the HeNB 110B.

The MME 130, which is connected to the MeNB 110A, is a device (Mobility Management Entity) that manages the mobility of the UE 10 having set up of a radio connection with the MeNB 110A. Furthermore, the MME 130, which is connected to the HeNB 110B via the HeNB-GW 120B, is a device that manages the mobility of the UE 10 having set up of a radio connection with the HeNB 110B.

The MNB 210A, which manages a general cell 211A, is a device (NodeB) that performs radio communication with the UE 10 being present in the general cell 211A.

The HNB 210B, which manages a specific cell 211B, is a device (Home NodeB) that performs radio communication with the UE 10 being present in the specific cell 211B.

The RNC 220A, which is connected to the MNB 210A, is a device (Radio Network Controller) that sets up a radio connection (RRC Connection) with the UE 10 being present in the general cell 211A.

The HNB-GW 220B, which is connected to the HNB 210B, is a device (Home NodeB Gateway) that sets up a radio connection (RRC Connection) with the UE 10 being present in the specific cell 211B.

The SGSN 230 is a device (Serving GPRS Support Node) that performs packet switching in a packet switching domain. The SGSN 230 is provided in the core network 50. Although not illustrated in FIG. 1, a device (MSC; Mobile Switching Center) that performs circuit switching in a circuit switching domain may be provided in the core network 50.

In addition, it is noted that the general cell and the specific cell are understood as a function of performing radio communication with the UE 10. However, the general cell and the specific cell are also used as a term indicating a coverage area of a cell. Furthermore, cells such as general cells and specific cells are identified by frequencies, spreading codes, time slots or the like used in the cells.

Here, a coverage area of the general cell is wider than a coverage area of the specific cell. The general cell, for example, is a macro cell provided by a communication provider. The specific cell, for example, is a femto cell or a home cell provided by the third party other than the communication provider. However, the specific cell may be a CSG (Closed Subscriber Group) cell or a pico cell provided by the communication provider.

Hereinafter, the first communication system will be mainly described. The following description may also be applied to the second communication system.

Here, in the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, an uplink channel includes an uplink control channel (PUCCH; Physical Uplink Control Channel), an uplink shared channel (PUSCH; Physical Uplink Shared Channel), and the like. Furthermore, a downlink channel includes a downlink control channel (PDCCH; Physical Downlink Control Channel), a downlink shared channel (PDSCH; Physical Downlink Shared Channel), and the like.

The uplink control channel is a channel used to transfer a control signal. The control signal, for example, includes CQI (Channel Quality Indicator), PMI (Precoding Matrix Indicator), RI (Rank Indicator), SR (Scheduling Request), and ACK/NACK.

The CQI is a signal for notifying a recommended modulation method and an encoding rate to be used in downlink transmission. The PMI is a signal indicating a precoder matrix which is preferably used in downlink transmission. The RI is a signal indicating the number of layers (the number of streams) to be used in downlink transmission. The SR is a signal for requesting the assignment of an uplink radio resource (a resource block which will be described later). The ACK/NACK is a signal indicating whether a signal transmitted via the downlink channel (for example, the PDSCH) has been successfully received.

The uplink shared channel is a channel used to transfer a control signal (including the above-mentioned control signal) and/or a data signal. For example, the uplink radio resource may be assigned only to the data signal, or assigned such that the data signal and the control signal are multiplexed.

The downlink control channel is a channel used to transfer a control signal. The control signal, for example, includes Uplink SI (Scheduling Information), Downlink SI (Scheduling Information), and a TPC bit.

The Uplink SI is a signal indicating the assignment of the uplink radio resource. The Downlink SI is a signal indicating the assignment of a downlink radio resource. The TPC bit is a signal for instructing increase or decrease in the power of a signal transmitted via the uplink channel.

The downlink shared channel is a channel used to transfer a control signal and/or a data signal. For example, the downlink radio resource may be assigned only to the data signal, or assigned such that the data signal and the control signal are multiplexed.

In addition, a control signal transmitted via the downlink shared channel includes TA (Timing Advance). The TA is transmission timing correction information between the UE 10 and the MeNB 110A, and is measured by the MeNB 110A on the basis of an uplink signal transmitted from the UE 10.

Furthermore, a control signal transmitted via a channel, other than the downlink control channel (the PDCCH) and the downlink shared channel (the PDSCH), includes ACK/NACK. The ACK/NACK is a signal indicating whether a signal transmitted via the uplink channel (for example, the PUSCH) has been successfully received.

In addition, the general cell and the specific cell broadcast the broadcast information through a broadcast channel (BCCH; Broadcast Control Channel). The broadcast information, for example, is information such as MIB (Master Information Block) and SIB (System Information Block).

(Radio Frame)

Figure 2:
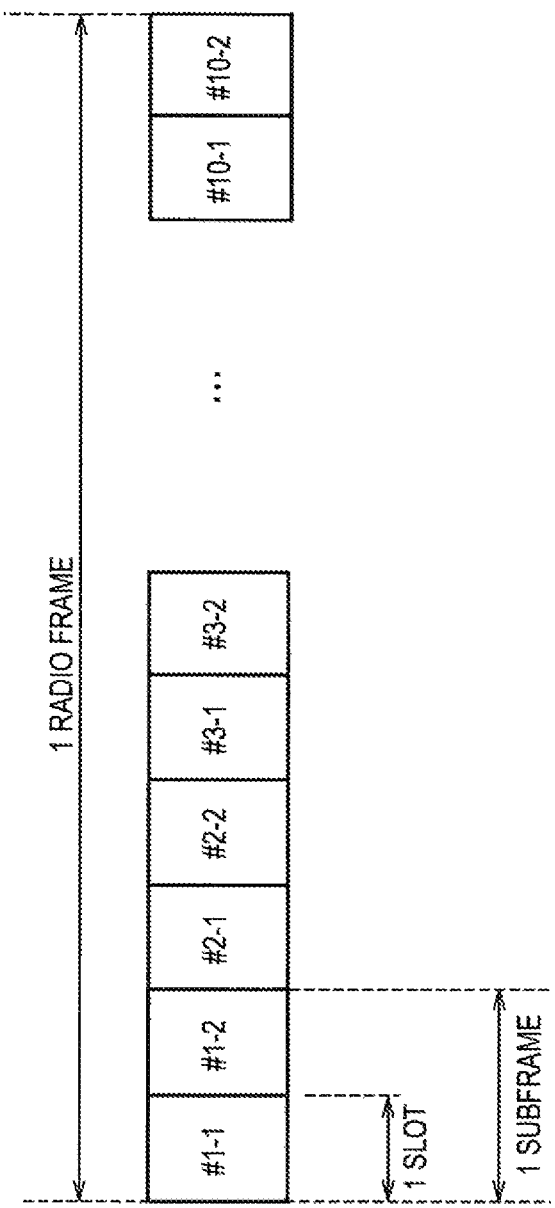
FIG. 2 is a diagram illustrating a radio frame according to the first embodiment.

Hereinafter, a radio frame in the first communication system will be described. FIG. 2 is a diagram illustrating the radio frame in the first communication system.

As illustrated in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in the downward direction. In the same manner, one slot is configured by a plurality of SC-FDMA symbols (for example, six SC-FDMA symbols or seven SC-FDMA symbols) in the upward direction.

(Radio Resource)

Figure 3:
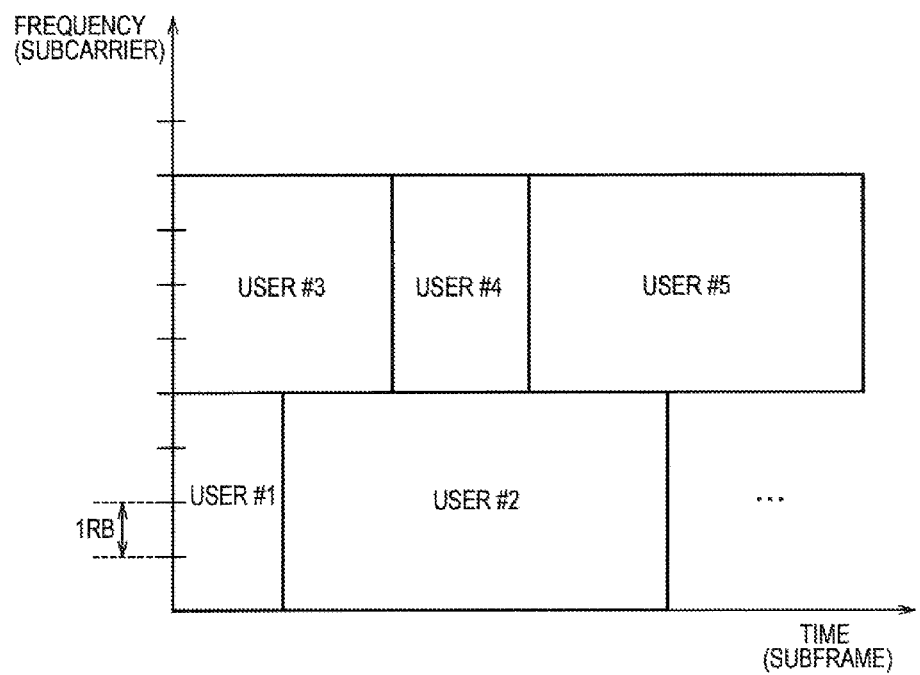
FIG. 3 is a diagram illustrating a radio resource according to the first embodiment.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency is configured by a plurality of subcarriers, and a predetermined number of subcarriers (12 subcarriers) are collectively called a resource block (RB). A time has a unit, such as the OFDM symbol (or the SC-FDMA symbol), the slot, the subframe, and the radio frame, as described above.

Here, the radio resource is assignable to each one resource block. Furthermore, on the frequency axis and the time axis, it is possible to divide the radio resources to assign the same to a plurality of users (for example, a user #1 to a user #5).

Furthermore, the radio resource is assigned by the MeNB 110A. The MeNB 110A assigns the radio resources to each UE 10 on the basis of the CQI, the PMI, the RI and the like.

(Application Scene)

Figure 4:
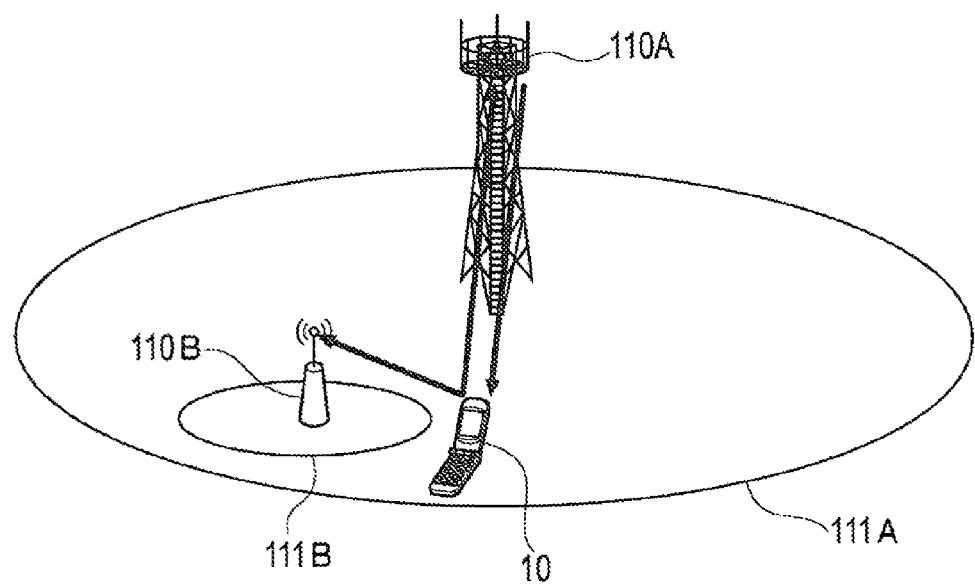
FIG. 4 is a diagram illustrating a case where the first embodiment is applied.

Hereinafter, a scene where the first embodiment is applied will be described. FIG. 4 is a diagram for explaining a scene where the first embodiment is applied. In FIG. 4, MeNB 110A and HeNB 110B are illustrated as an example of the radio base station.

As illustrated in FIG. 4, the uplink signal transmitted from the UE 10 is received by a plurality of radio base stations (MeNB 110A and HeNB 110B) coordinated with one another. Selection combining is performed for the uplink signals received by the plurality of radio base stations.

In the first embodiment, the uplink signals transmitted from the UE 10, for example, are transmitted through the aforementioned uplink shared channel (PUSCH).

The UE 10 controls the transmission power ($P_{PUSCH, c}(i)$) of the uplink signal (PUSCH) according to the equation described below.

$$P_{PUSCH,c}(i) = \min\left\{ \begin{array}{l} P_{CMAX,c}(i) \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array} \right\} [\text{dBm}] \quad \text{[Equation 1]}$$

$P_{CMAX,c}(i)$: Maximum transmission power of the radio terminal $M_{PUSCH,c}(i)$: Number of RBs assigned to PUSCH in the subframe i $P_{O\_PUSCH,c}(j)$: Default value of the transmission power per one RB, which is specific to the radio terminal $\alpha_c(j)$: Compensation factor of path loss $PL_c$: path loss $\Delta TF, c(i)$: Correction term of the transmission power determined by the modulation coding scheme (MCS)

$f_c(i)$: Correction term of the transmission power determined by the TPC command transmitted from the radio base station to the radio terminal Here, $PL_c$ is the path loss calculated according to "referenceSignalPower-RSRP". RSRP (Reference Signal Received Power) is the received power of the reference signal transmitted from the radio base station.

(Radio Base Station)

Figure 5:
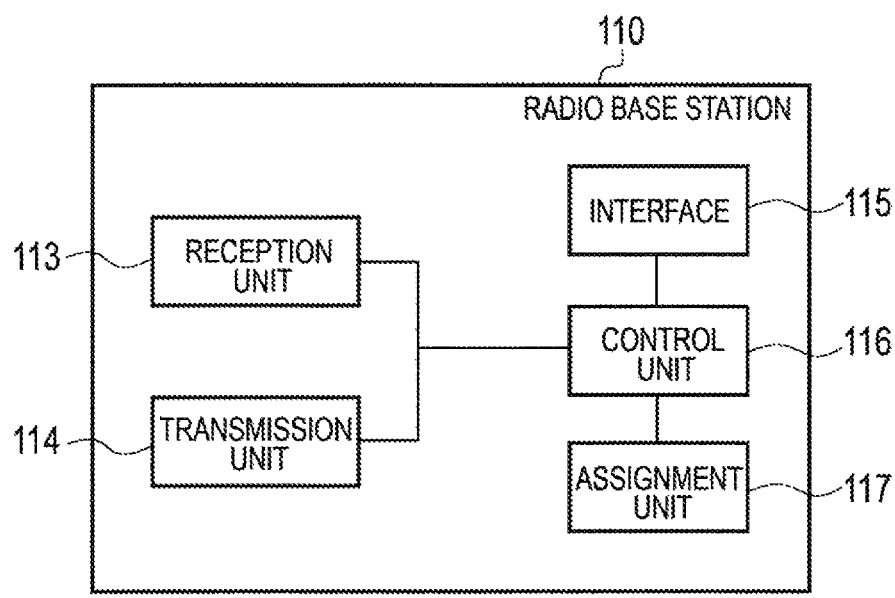
FIG. 5 is a block diagram illustrating a radio base station 110 according to the first embodiment.

Hereinafter, the radio base station according to the first embodiment will be described. FIG. 5 is a block diagram illustrating a radio base station 110 according to the first embodiment. The radio base station 110 may be the MeNB 110A or the HeNB 110B.

As illustrated in FIG. 5, the radio base station 110 has a reception unit 113, a transmission unit 114, an interface 115, a control unit 116, and an assignment unit 117.

The reception unit 113 receives an uplink signal from the UE 10 connected to a cell managed by the radio base station 110. The reception unit 113, for example, receives the uplink signal through the uplink shared channel (PUSCH).

The transmission unit 114 transmits a downlink signal to the UE 10 connected to the cell managed by the radio base station 110. The transmission unit 114, for example, transmits a radio resource (scheduling information) assigned by the assignment unit 117. The transmission unit 114, for example, transmits to the UE 10, the information for specifying the plurality of radio base stations that receive the uplink signal coordinated with one another (hereinafter, the radio base station information). That is, in the first embodiment, the transmission unit 114 configures a notification unit that notifies to the UE 10 the radio base station information for specifying the plurality of radio base stations that receive the uplink signal coordinated with one another.

The interface 115 is an interface used to communicate with another radio base station through a backhaul network. The interface 115 is an X2 interface for directly connecting radio base stations to each other. Alternatively, the interface 115 is an S1 interface for connecting the radio base stations to each other through an upper node (for example, the MME 130).

The control unit 116 controls the operation of the radio base station 110. The control unit 116, for example, acquires the information for specifying the plurality of radio base stations that receive the uplink signal coordinated with one another. The control unit 116 acquires the radio base station information for specifying the plurality of radio base stations that receive the uplink signal coordinated with one another through the interface 115. The control unit 116 instructs the transmission of the radio base station information to the transmission unit 114.

The assignment unit 117 assigns a radio resource to the UE 10 connected to the cell managed by the radio base station 110.

(Radio Terminal)

Figure 6:
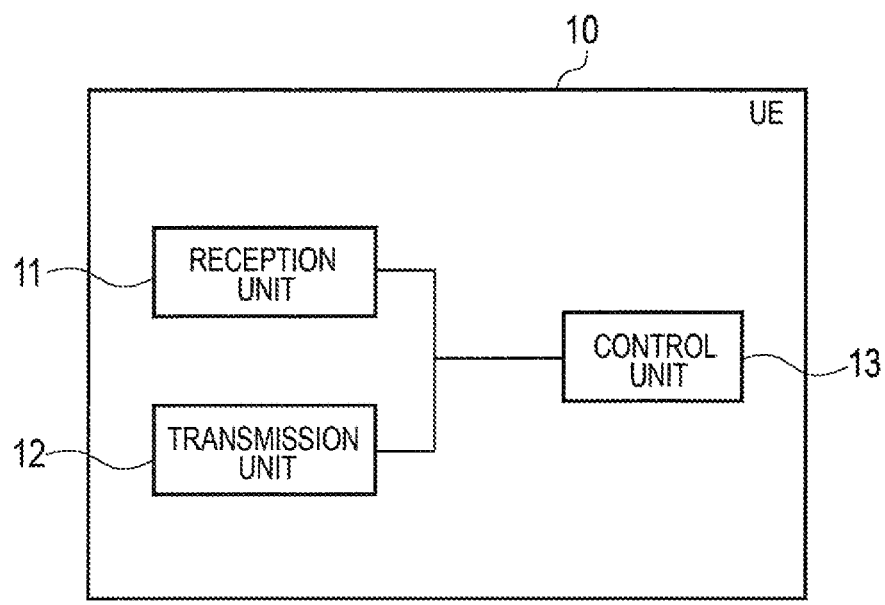
FIG. 6 is a block diagram illustrating UE 10 according to the first embodiment.

Hereinafter, a radio terminal in the first embodiment will be described. FIG. 6 is a block diagram illustrating UE 10 according to the first embodiment. As illustrated in FIG. 6, the UE 10 has a reception unit 11, a transmission unit 12, and a control unit 13.

The reception unit 11 receives a downlink signal from the radio base station 110. The reception unit 11, for example, receives the radio resource (scheduling information) assigned by the radio base station 110. The reception unit 11, for example, receives the radio base station information for specifying the plurality of radio base stations that receive the uplink signal coordinated with one another.

The transmission unit 12 transmits an uplink signal to the radio base station 110. The transmission unit 12, for example, transmits the uplink signal through the uplink shared channel (PUSCH).

The control unit 13 controls the operation of the UE 10. In the first embodiment, the control unit 13 controls the transmission power of the uplink signal (PUSCH). In detail, the control unit 13 controls the transmission power ($P_{PUSCH,c}(i)$) of the uplink signal according to the equation described below.

$$P_{PUSCH,c}(i) = \min\left\{\begin{array}{c} P_{CMAX,c}(i) \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\}[\text{dBm}] \quad \text{[Equation 2]}$$

Here, $PL_c$ is the path loss, which is specified according to the procedure described below. Firstly, the control unit 13 specifies the plurality of radio base stations that receive the uplink signal coordinated with one another on the basis of the radio base station information notified from the radio base station 110, and then acquires the path losses between each of the plurality of specified radio base stations and the UE 10. In detail, the control unit 13 measures the path loss between the specified radio base station and the UE 10 on the basis of the downlink signal (for example, the reference signal) transmitted from the specified radio base station.

Secondly, the control unit 13 specifies the path loss used in the transmission power control of the uplink signal. A case in which the path losses between each of the plurality of radio base stations that receive the uplink signal coordinated with one another and the UE 10 are $PL_p$, $PL_q$, $PL_r$ and $PL_s$ is taken into consideration. However, the path losses have a relationship of $PL_p > PL_q > PL_r > PL_s$.

(A) Smallest Path Loss

The control unit 13 may specify the smallest path loss as the path loss used in the transmission power control of the uplink signal. That is, the control unit 13 specifies $PL_s$ as the path loss used in the transmission power control of the uplink signal.

(B) Predetermined Number of Path Losses

The control unit 13 specifies the reciprocal of the sum of reciprocals of the predetermined number of path losses as the path loss used in the transmission power control of the uplink signal. For example, when all of $PL_p$, $PL_q$, $PL_r$, and $PL_s$ are used, the control unit 13 specifies $1/\{1/PL_p + 1/PL_q + 1/PL_r + 1/PL_s\}$ as the path loss used in the transmission power control of the uplink signal.

The control unit 13 may select the predetermined number of path losses in an order starting from the smallest path loss. For example, when the predetermined number is "2", the control unit 13 specifies $1/\{1/PL_r + 1/PL_s\}$ as the path loss used in the transmission power control of the uplink signal.

(Operation of Mobile Communication System)

Hereinafter, the operation of the mobile communication system according to the first embodiment will be described. FIG. 7 is a sequence diagram illustrating an operation of the mobile communication system 100 according to the first embodiment.

A case in which the uplink signal transmitted from the UE 10 is received by the MeNB 110A and the HeNB 110B coordinated with one another is illustrated. Furthermore, the radio base station that assigns a radio resource to the UE 10 is the MeNB 110A.

In step 10, the MeNB 110A specifies the plurality of radio base stations that receive the uplink signal coordinated with one another.

In step 20, the MeNB 110A transmits, to the UE 10, the radio base station information for specifying the plurality of radio base stations that receive the uplink signal coordinated with one another.

In step 30, on the basis of the radio base station information notified from the MeNB 110A, the UE 10 specifies the plurality of radio base stations that receive the uplink signal coordinated with one another, and measures the path losses between each of the plurality of specified radio base stations and the UE 10.

In step 40, the UE 10 determines the transmission power of the uplink signal. The UE 10 determines the transmission power of the uplink signal ($P_{PUSCH,\ c}(i)$) according to the equation described below.

$$P_{PUSCH,c}(i) = \min\left\{\begin{array}{l} P_{CMAX,c}(i) \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} [\text{dBm}] \quad [\text{Equation 3}]$$

Here, $PL_c$ is the path loss, which is specified according to the procedure described below. For example, of the path losses corresponding to the radio base stations that receive the uplink signal coordinated with one another, the UE 10 may specify the smallest path loss as the path loss used in the transmission power control of the uplink signal. Alternatively, of the path losses corresponding to the radio base stations that receive the uplink signal coordinated with one another, the UE 10 may specify the reciprocal of the sum of reciprocals of a predetermined number of path losses as the path loss used in the transmission power control of the uplink signal. The predetermined number of path losses is preferably selected in an order starting from the smallest path loss.

In step 50, the UE 10 transmits the uplink signal to the MeNB 110A and the HeNB 110B using the transmission power determined in step 40. The MeNB 110A and the HeNB 110B receive the uplink signal coordinated with one another.

(Operation and Effect)

In the embodiment, on the basis of the information notified from the radio base station 110 (for example, the MeNB 110A), the UE 10 specifies the plurality of radio base stations that receive the uplink signal coordinated with one another, and performs transmission power control of the uplink signal in accordance with the path losses between each of the plurality of radio base stations and the radio terminal. As a result, the state in which the transmission power of the uplink signal is excessive is avoided, and the transmission power of the uplink signal can be controlled appropriately.

[Other Embodiments]

The present invention is explained through the above embodiment, but it must not be understood that this invention is limited by the statements and the drawings constituting a part of this disclosure. From this disclosure, various alternative embodiments, examples, and operational technologies will become apparent to those skilled in the art.

In the embodiment, the radio base stations that receive the uplink signal coordinated with one another are the MeNB 110A and the HeNB 110B. However, the embodiment is not limited thereto. The radio base stations that receive the uplink signal coordinated with one another may be a plurality of MeNBs 110A. Alternatively, the radio base stations that receive the uplink signal coordinated with one another may be a plurality of HeNBs 110B.

In the embodiment, the radio base station that notifies the radio base station information for specifying the plurality of radio base stations that receive the uplink signal coordinated with one another is the radio base station (for example, the MeNB 110A) that assigns the radio resource to the UE 10. However, the embodiment is not limited thereto. The radio base station that notifies the radio base station information may be any one of the radio base stations that receive the uplink signal coordinated with one another.

In addition, the entire content of U.S. Provisional Application No. 61/604,697 (filed on Feb. 29, 2012) is incorporated in the present specification by reference.

INDUSTRIAL APPLICABILITY

According to the present invention, the state in which the transmission power of the uplink signal is excessive is avoided, and the transmission power of the uplink signal can be controlled appropriately.

The invention claimed is:

1. A mobile communication system, comprising:
a plurality of radio base stations; and
a radio terminal, wherein
the plurality of radio base stations receive an uplink signal transmitted from the radio terminal,
selection combining is performed for the uplink signal received by the plurality of radio base stations,
at least one radio base station of the plurality of radio base stations comprises:
a notification unit that notifies the radio terminal of information for specifying the plurality of radio base stations receiving the uplink signal transmitted from the radio terminal, and
the radio terminal comprises a control unit that specifies the plurality of radio base stations receiving the uplink signal transmitted from the radio terminal on a basis of the information notified from the notification unit, and performs transmission power control of the uplink signal in accordance with path losses between each of the plurality of radio base stations and the radio terminal, and
a path loss used in the transmission power control of the uplink signal is a reciprocal of a sum of reciprocals of a predetermined number of path losses among the path losses between each of the plurality of radio base stations and the radio terminal.

2. The mobile communication system according to claim 1, wherein at least one radio base station comprising the notification unit is a radio base station that assigns an uplink resource to the radio terminal.

3. The mobile communication system according to claim 1, wherein the path loss used in the transmission power control of the uplink signal is a smallest path loss among path losses between each of the plurality of the radio base stations and the radio terminal.

4. The mobile communication system according to claim 1, wherein the predetermined number of path losses is selected in an order starting from a smallest path loss among path losses between each of the plurality of the radio base stations and the radio terminal.

5. A mobile communication method in which a plurality of radio base stations receive an uplink signal transmitted from a radio terminal, comprising:
   notifying, by at least one radio base station of the plurality of radio base stations, to the radio terminal, information for specifying the plurality of radio base stations receiving the uplink signal transmitted from the radio terminal;
   specifying, by the radio terminal, the plurality of radio base stations receiving the uplink signal transmitted from the radio terminal on a basis of the information notified by the at least one radio base station of the plurality of radio base stations, and performing, by the radio terminal, transmission power control of the uplink signal in accordance with path losses between each of the plurality of radio base stations and the radio terminal; and
   performing selection combining for the uplink signal received by the plurality of radio base stations, wherein
   a path loss used in the transmission power control of the uplink signal is a reciprocal of a sum of reciprocals of a predetermined number of path losses among the path losses between each of the plurality of radio base stations and the radio terminal.

6. A radio base station used in a mobile communication system in which a plurality of radio base stations receive an uplink signal transmitted from a radio terminal, comprising:
   a notification unit that notifies the radio terminal of information for specifying the plurality of radio base stations receiving the uplink signal transmitted from the radio terminal, which performs transmission power control of the uplink signal in accordance with path losses between each of the plurality of radio base stations and the radio terminal, wherein
   selection combining is performed for the uplink signal received by the plurality of radio base stations, and
   a path loss used in the transmission power control of the uplink signal is a reciprocal of a sum of reciprocals of a predetermined number of path losses among the path losses between each of the plurality of radio base stations and the radio terminal.

7. A radio terminal used in a mobile communication system in which a plurality of radio base stations receive an uplink signal transmitted from the radio terminal, comprising:
   a reception unit that receives information for specifying the plurality of radio base stations receiving the uplink signal transmitted from the radio terminal from at least one radio base station of the plurality of radio base stations; and
   a control unit that specifies the plurality of radio base stations receiving the uplink signal transmitted from the radio terminal on a basis of the information received in the reception unit, and that performs transmission power control of the uplink signal in accordance with path losses between each of the plurality of radio base stations and the radio terminal, wherein
   selection combining is performed for the uplink signal received by the plurality of radio base stations, and
   a path loss used in the transmission power control of the uplink signal is a reciprocal of a sum of reciprocals of a predetermined number of path losses among the path losses between each of the plurality of radio base stations and the radio terminal.

* * * * *